United States Patent [19]

Shimomura

[11] Patent Number: 4,768,489
[45] Date of Patent: Sep. 6, 1988

[54] FUEL CONTROL APPARATUS

[75] Inventor: Setsuhiro Shimomura, Himeji, Japan

[73] Assignee: Mitsubishi Denki Kabushiki Kaisha, Tokyo, Japan

[21] Appl. No.: 31,554

[22] Filed: Mar. 30, 1987

[30] Foreign Application Priority Data

| Apr. 1, 1986 [JP] Japan ................................. 61-75855 |
| Apr. 1, 1986 [JP] Japan ................................. 61-75856 |
| Apr. 25, 1986 [JP] Japan ................................. 61-97213 |

[51] Int. Cl.$^4$ .............................................. F02B 3/00
[52] U.S. Cl. ................................. 123/479; 123/494
[58] Field of Search .................... 123/479, 494, 488

[56] References Cited

U.S. PATENT DOCUMENTS

| 4,505,248 | 3/1985 | Yazawa ............................... 123/494 |
| 4,579,098 | 4/1986 | Mattes ................................ 123/494 |

FOREIGN PATENT DOCUMENTS

| 0162293 | 11/1985 | European Pat. Off. ............ 123/494 |
| 2815780 | 10/1979 | Fed. Rep. of Germany ...... 123/494 |
| 3207394 | 9/1983 | Fed. Rep. of Germany ...... 123/494 |
| 2130749 | 6/1984 | United Kingdom ................ 123/494 |

Primary Examiner—Ronald B. Cox
Attorney, Agent, or Firm—Oblon, Fisher, Spivak, McClelland & Maier

[57] ABSTRACT

A fuel control apparatus comprises a hot-wire type intake air quantity sensor disposed in an air intake passage for an internal combustion engine to detect the quantity of air passing therethrough, a fuel control valve placed in the air intake passage and injecting fuel, a burning-off section for heating a hot wire at a temperature higher than a temperature in a normal operation, after the engine has been stopped, so as to burn off a deposit on the hot wire, wherein the operation of an injector is stopped by detecting an output of the sensor for a predetermined time to thereby prevent undesired firing of the fuel.

3 Claims, 7 Drawing Sheets

FUEL CONTROL APPARATUS

FIELD OF THE INVENTION

The present invention relates to a fuel control apparatus for an internal combustion engine. More particularly, it relates to an improved system for burning at a high temperature a deposit on the surface of a hot-wire type intake air quantity sensor used for the fuel control apparatus.

BACKGROUND OF THE INVENTION

The characteristics of hot-wire type intake air quantity sensors change depending on substances deposited on the surface of the sensors. Deposition of the substances causes an error in the quantity of fuel to be supplied to an engine, whereby there arise problems of deterioration of the exhaust gas and reduction in operational performance. To cope with the problems, the hot wire has been heretofore heated at a temperature higher than a temperature in the normal operation of the engine after the engine has been stopped to thereby burn off the deposit. A method of burning-off of the deposit is disclosed, for instance, in Japanese Unexamined Patent Publication No. 76182/1979.

It is revealed from experiments that temperature for heating the hot wire should be about 1000° C. in order to obtain an effective burning-off operation. However, when the hot wire is heated at 1000° C., a fuel-air mixture is possibly fired. The firing of the fuel-air mixture is inconvenient for the operation of the intake air quantity sensor disposed in an intake passage for a gasoline engine. Heretofore, in order to avoid the firing of the fuel-air mixture, the burning-off operations have been carried out only when the temperature of the intake passage and the revolution of the engine satisfy predetermined conditions during its operation and the fuel-air mixture excessively supplied to the intake passage during warming-up operations for the engine is sufficiently scavenged. Alternatively, the burning-off operations have been carried out before the fuel-air mixture reversely flowing from a fuel supplying portion after the engine has been stopped reaches the intake air quantity sensor, the reversing time of the mixture being obtained by experiments.

However, various experiments revealed that the burning-off under the above-mentioned conditions have not provided a sufficient result because the firing of the fuel-air mixture has been often caused. Namely, under the condition of continuous burning-off operation due to uncontrolability of a burning-off control circuit, an output from the intake air sensor in a period from starting of the engine to an idling operation becomes several tens times as large as an output in the normal operation. In such condition, an amount of the fuel to be supplied to the engine is about several tens times as normally required. Accordingly, there is no complete combustion of the fuel, and a large amount of the fuel remains in the intake passage. This may cause the firing of the fuel by the hot wire heated at about 1000° C.

There is another problem in the detection of the output from the intake air sensor. Namely, when the engine is restarted during the burning-off operation or immediately after the completion of the burning-off operation, the output of the sensor is reduced to be nearly zero volt in a period (about 5 seconds) before the temperature of the hot wire returns to the normal operation temperature.

If the output of the intake air quantity sensor is detected at that moment, to examine whether or not the sensor is faulty, erroneous judgment will be given. Further, when the fuel is to be supplied under the condition of an abnormal output of the sensor, an erroneous air-fuel ratio will be given.

OBJECT OF THE INVENTION

It is an objecct of the present invention to provide a fuel control apparatus for eliminating possibility of the firing of fuel even though there is erroneous operation in the burning-off when an internal combustion engine is started.

SUMMARY OF THE INVENTION

According to the present invention, there is provided a fuel control apparatus which comprises a hot-wire type intake air quantity sensor disposed in an intake passage for an internal combustion engine to detect the quantity of air passing therethrough, a fuel control valve placed in the air intake passage and injecting fuel, a burning-off section for heating a hot wire at a temperature higher than a temperature in a normal operation, after the engine has been stopped, so as to burn off a deposit on the hot wire, and means for calculating an amount of the fuel required for operating the engine on the basis of an output of the sensor so as to control the fuel control valve according to a calculated value and for detecting erroneous operation of the burning-off section to thereby stop the operation of the fuel control valve.

As another aspect of the present invention, there is provided a fuel control apparatus for calculating the quantity of fuel required for operating an internal combustion engine based on an output of a hot-wire type intake air quantity sensor disposed in an intake passage for the internal combustion engine and supplying the optimum amount of fuel to the engine by controlling a fuel control valve in accordance with the calculated value, characterized in that the fuel control apparatus comprises a burn-off control section for heating the hot wire at a temperature higher than a temperature in a normal operation, after the engine has been stopped, so as to burn off a deposit on the hot wire, and means for judging an output from the sensor when the engine is to be started and stopping the operation of the fuel control valve when the output indicates a high temperature level which corresponds to the burning-off condition.

As another aspect of the present invention, there is provided a fuel control apparatus for calculating the quantity of fuel required for operating an internal combustion engine based on an output of a hot-wire type intake air quantity sensor disposed in an intake passage for the internal combustion engine and supplying the optimum amount of fuel to the engine by controlling a fuel control valve in accordance with the calculated value, characterized in that the fuel control apparatus comprises a burn-off control section for heating the hot wire at a temperature higher than a temperature in a normal operation, after the engine has been stopped, so as to burn off a deposit on the hot wire, a fault detecting section for detecting a fault in the sensor on the basis of the output of the sensor, and means for stopping the operation of the fault detecting section until the output of the sensor reaches a predetermined level.

DETAILED DESCRIPTION OF THE PREFERRED EMBODIMENTS

Preferred embodiments of the fuel control apparatus of the present invention will be described with reference to the drawings.

Figure 1:
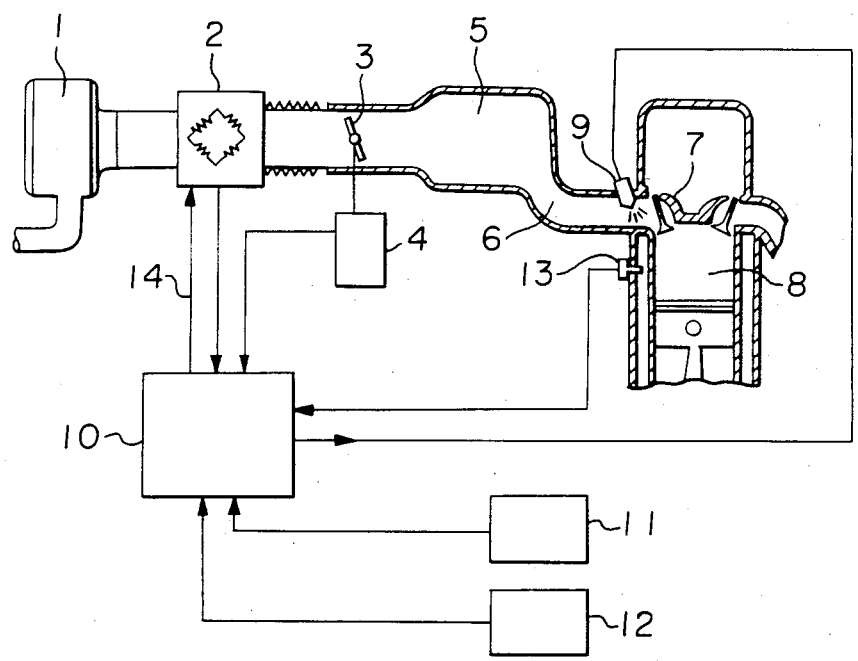
FIG. 1 is a diagram showing an embodiment of the fuel control apparatus according to the present invention.

FIG. 1 is a diagram showing the construction of a typical fuel injection controlling apparatus using a hot-wire type intake air quantity sensor (hereinbelow, referred to as an AFS) for detecting the quantity of air sucked into an internal combustion engine. In FIG. 1, a reference numeral 1 designates an air cleaner, and an AFS 2 is disposed in an air intake passage connected to the air cleaner. A numeral 3 designates a throttle valve for controlling the quantity of air sucked into the engine, a numeral 4 designates a throttle sensor being operable in association with the throttle valve 3 and generating a voltage signal depending on the movement of the throttle valve 3, a numeral 5 designates a surge tank, a numeral 6 desigantes an intake manifold, and a numeral 7 designates an inlet valve driven by a cam (not shown).

A fuel control valve 9 (hereinbelow referred to as an injecter) is provided for each cylinder 8. In FIG. 1, only one cylinder 8 is shown for simplification of the figure, although a plurality of the cylinders are in fact provided in the engine. A numeral 10 designates an electronic control unit (hereinbelow, referred to as an ECU) which controls an amount of the fuel injected from the injector 9 at a predetermined air-fuel ratio with respect to the quantity of air sucked to each of the cylinders 8. The ECU 10 determines the fuel quantity to be injected on the basis of each signal from the AFS 2, a crank angle sensor 11, a starting switch 12, a temperature sensor 13 for detecting the temperature of cooling water for the engine, and the throttle sensor 4, and it controls the pulse width for feeding the fuel so that the fuel is intermittently injected from the injector 9 in synchronism with the signal of the crank angle sensor 11 at a constant interval. The ECU 10 generates a burning-off control signal 14 when conditions for the burning-off are all satisfied. The construction and function related to control of the burning-off of the AFS are well known, and therefore description is omitted.

Figure 2:
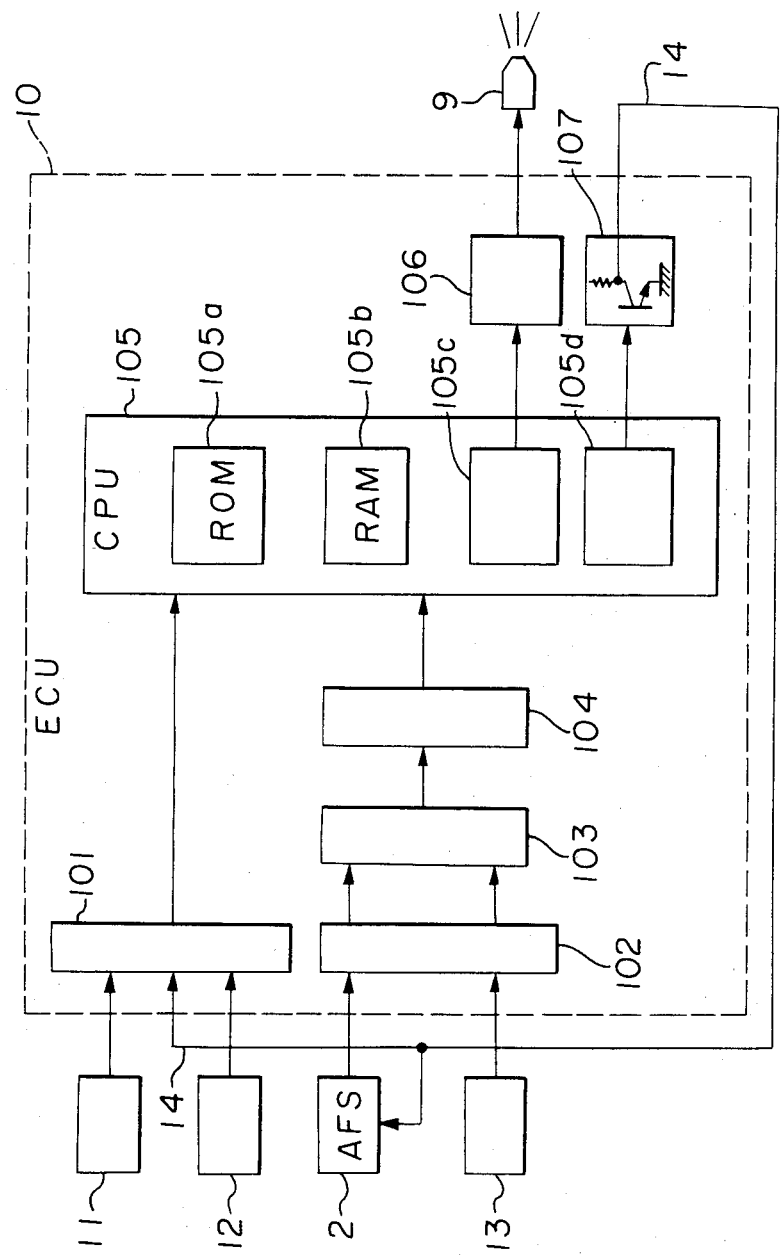
FIG. 2 is a block diagram showing a first embodiment of the electronic control unit used for the fuel control apparatus shown in FIG. 1.

FIG. 2 is a block diagram showing an internal structure of the ECU 10. In FIG. 2, a reference numeral 101 designates an interface circuit for inputting digital values from the crank angle sensor 11 and the starting switch 12.

An output signal from the interface circuit 101 is supplied to a central processing unit 105 (hereinbelow referred to as a CPU).

An analogue interface circuit 102 receives each signal from the AFS 2 and the water temperature sensor 13 and outputs an output signal to a multiplexer 103. An analogue signal from the multiplexer 103 is fed to an analogue-digital (A/D) transducer 104 in which the analogue signal is converted into a digital signal to be supplied to the CPU 105.

The CPU 105 includes a ROM 105a, a RAM 105b and timers 105c and 105d. The CPU 105 calculates the pulse width for actuating the injector 9 according to a program stored in the ROM 105a on the basis of the signals from the interface circuit 101 and the A/D transducer 104, and it outputs a pulse having a predetermined time width through the time 105c. A driving circuit 106 amplifies the pulse signal to drive the injector 9 which injects fuel to the cylinder 8 at the given time width. A system for controlling the quantity of the fuel is known, and therefore description is omitted.

The time 105d is adapted to produce a burning-off pulse signal according to a programmed operation. The pulse signal is amplified in a driving circuit 107 to be supplied as a burning-off signal 14 to the AFS 2.

The burning-off signal 14 is also inputted into the CPU 105 through the digital interface circuit 101. A program is previously prepared in such a manner that when the CPU 105 receives the burning-off signal 14, it does not generate a driving pulse to the driving circuit 106 to operate the injector 9.

Figure 2A:
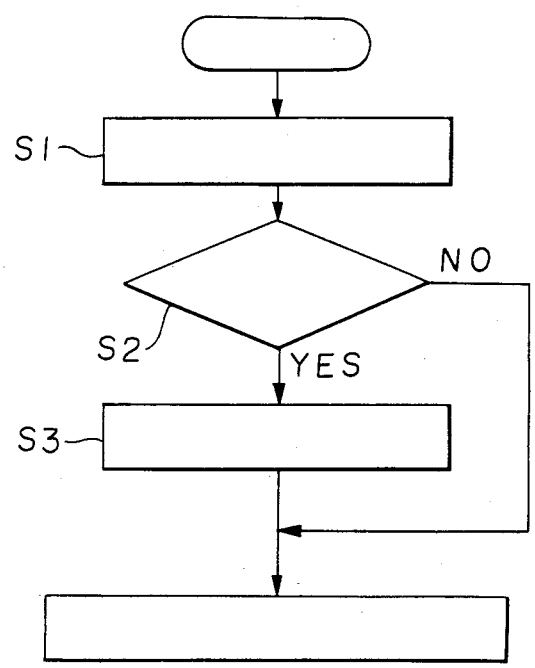
FIG. 2A is a flow chart showing an example of a program for the fuel control apparatus of the first embodiment.

FIG. 2A is a flow chart showing a program for prohibiting the operation of the injector.

At Step S1, the burning-off signal is read. At Step S2, determination is made whether or not the burning-off operation is carried out. If yes, an injection prohibition flag is set at Step S3. Then, the injector is not actuated when there is found no burning-off operation, then the injector is actuated.

The discussion described above is the case that determination is made as to whether or not the AFS 2 is in burning-off condition, and a signal indicative of the burning-off state of the AFS is inputted into the CPU 105 through the digital interface circuit 101. The main purpose of the construction as shown in FIG. 2 is to protect the CPU 105 so as not to enter various induced noises on a conductor 14A connecting the driving circuit 107 to the AFS 2. If the harmful induced noises can be eliminated, the output of the driving circuit 107 may be directly inputted into the CPU 105 in the ECU 10.

Figure 3A:
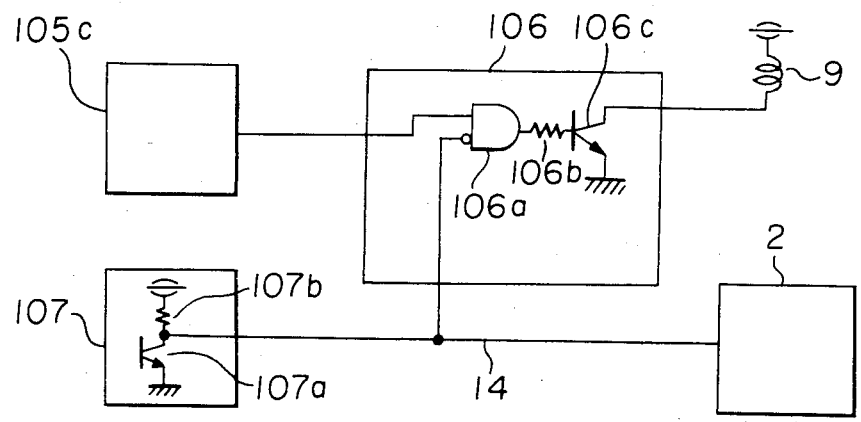
FIG. 3A is a block diagram showing in more detail a part of an electronic control in FIG. 3.
Figure 3:
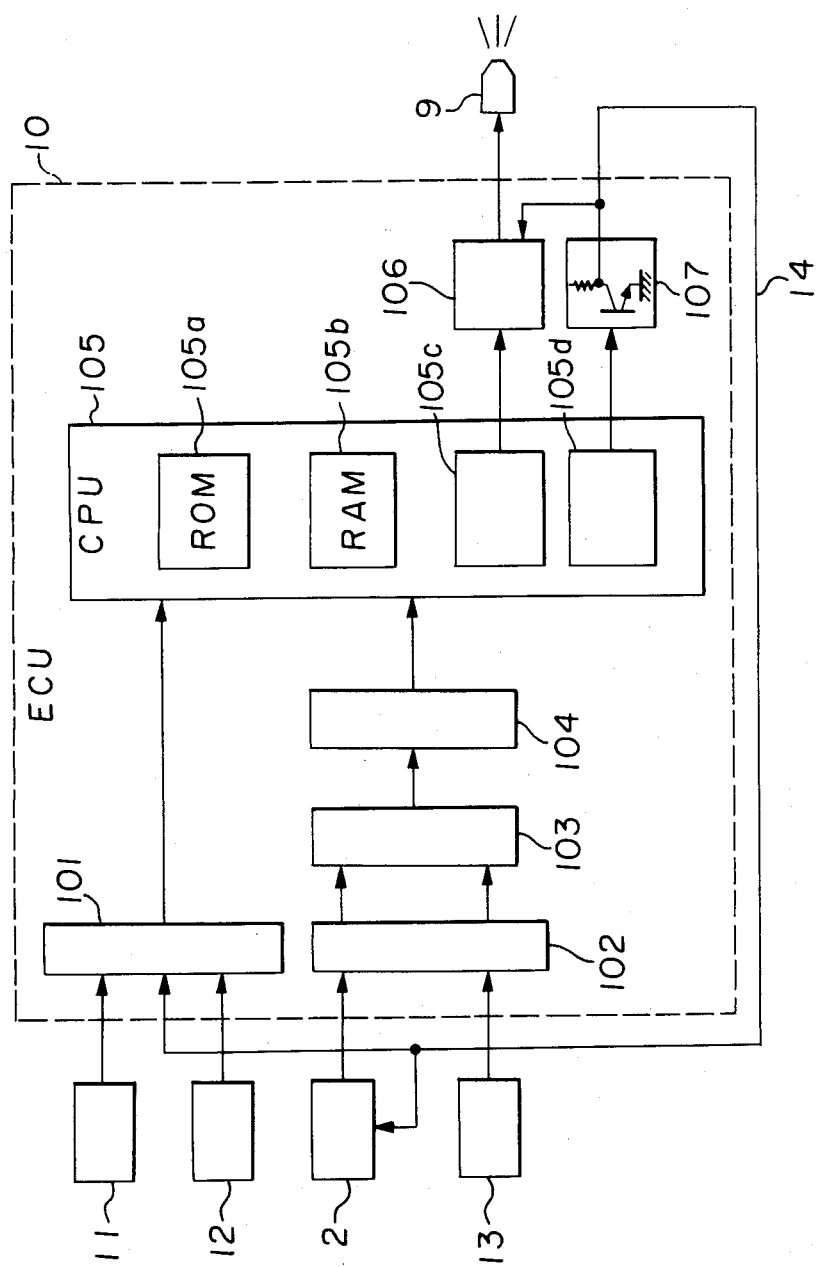
FIG. 3 is a block diagram showing a second embodiment of the electronic control unit used for the fuel control apparatus shown in FIG. 1.

A second embodiment of the ECU will be described with reference to FIG. 3. In FIG. 3, the output of the driving circuit 107 is also supplied to the driving circuit 106. In this case, a program is prepared so that when the driving circuit 107 produces an output corresponding to the burning-off condition, the driving circuit 106 does not provide a driving pulse to the injector 9.

Such function can be realized by using an element having a gate. FIG. 3A shows a part of the ECU 10 as an embodiment of a gate function circuit. In FIG. 3A, when the burning-off operation is carried out, a transistor 107a in the driving circuit 107 is in an off-state and the burning-off signal is at a high level. Accordingly, the output from the timer 105c is cut by a gate means 106a, whereby a transistor 106c is in an off-state and the injector 9 is not actuated. Numerals 106b and 107b respectively designate resistors.

The embodiment shown in FIG. 3 can certainly stop the injector 9 even when the CPU 105 becomes uncontrollable and the burning-off takes place.

In the embodiments described above, the burning-off condition of the AFS 2 is examined, and the operation of the injector 9 is controlled. Accordingly, there is no risk of supply the fuel due to an erroneous output corresponding to the burning-off, and hence the firing of the fuel can be avoided.

Figure 4:
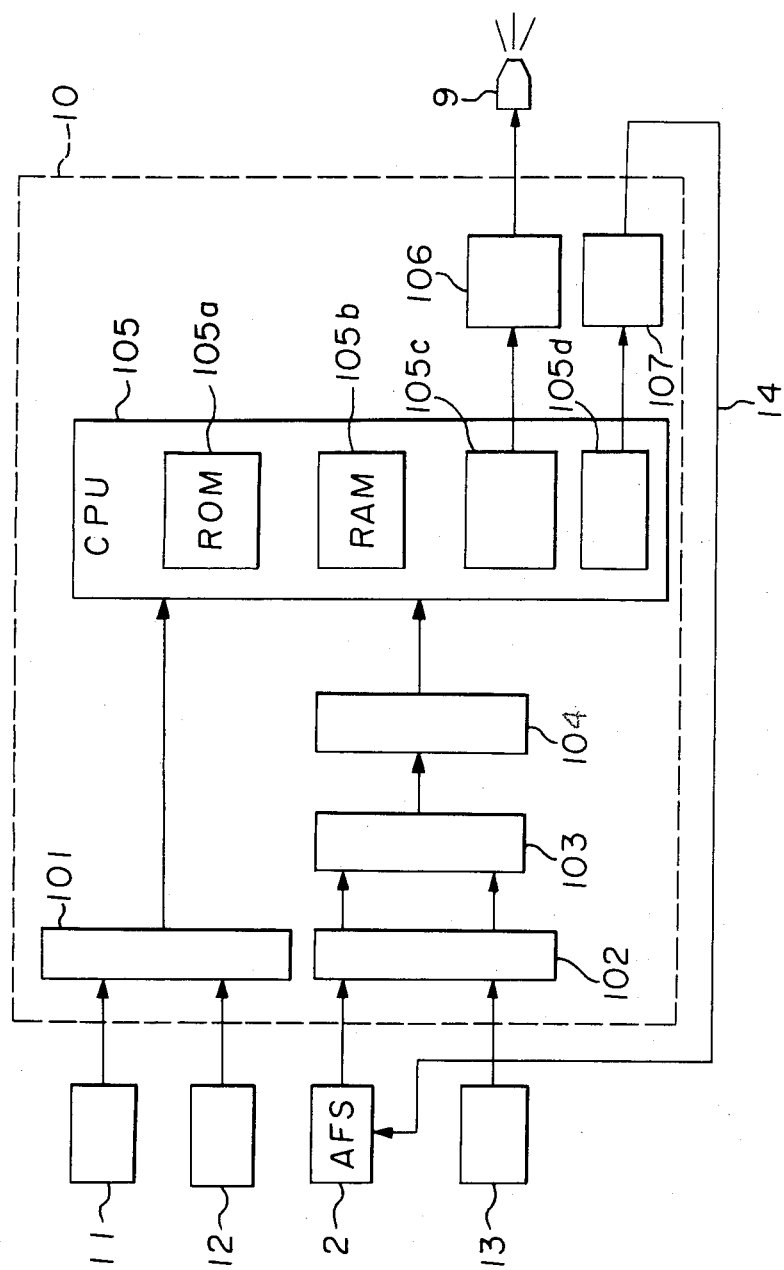
FIG. 4 is a third embodiment of the electronic control unit used for the fuel control apparatus shown in FIG. 1.
Figure 5:
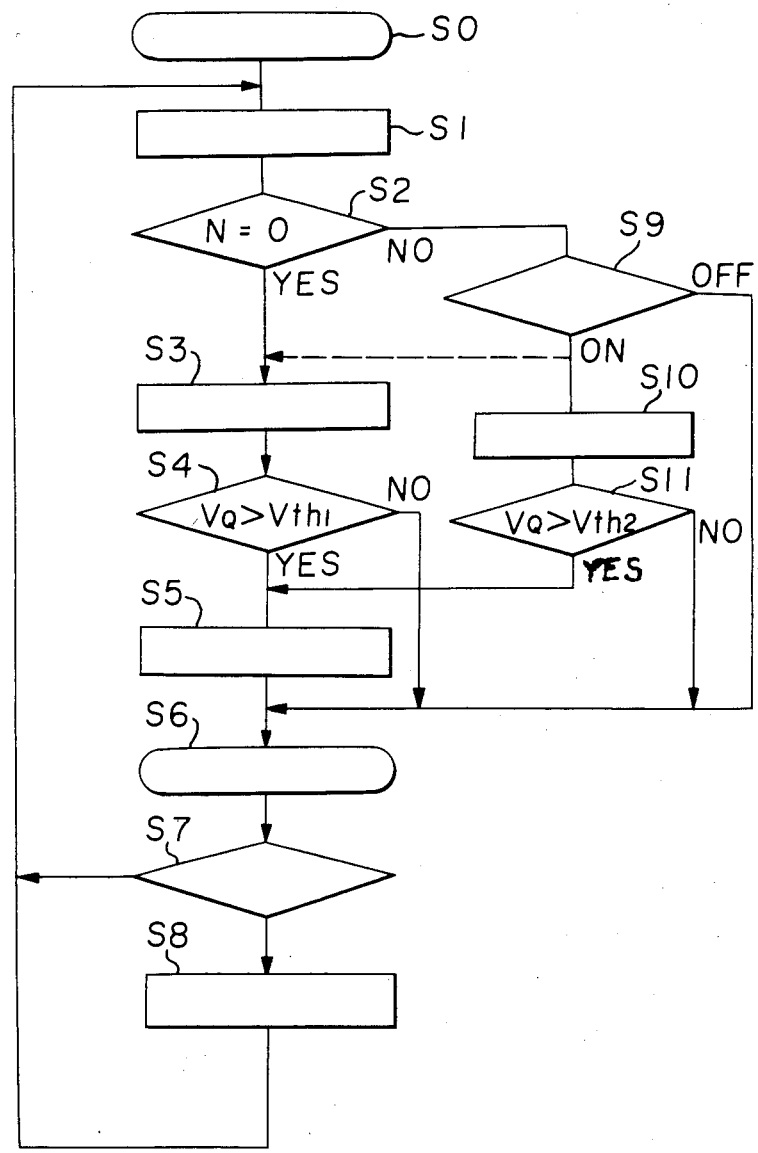
FIGS. 5 and 6 show a flow chart showing an example of execution of a program for the fuel control apparatus according to the third embodiment of the present invention.

A third embodiment of the fuel control apparatus according to the present invention will be described with reference to FIGS. 4 and 5.

The general construction of the fuel control apparatus is the same as that of the first and second embodiments shown in FIGS. 2 and 3, provided that the burning-off signal 14 which is a pulse signal produced in the timer 105d and amplified in the driving circuit 107 is supplied only to the AFS 2.

A program for controlling the burning-off operation for the third embodiment of the fuel control apparatus will be described with reference to FIG. 5.

The program starts at Step S0 upon turning on a key switch. At Step S1, the number of revolution N is read. Then, determination is made as to whether or not the revolution number is zero at Step S2. When N=0, namely, the engine is not started, an output $V_Q$ from the AFS 2 is read at Step S3. At Step S4, determination is made whether the output $V_Q$ is higher or lower than a predetermined value $V_{th1}$. The predetermined value $V_{th1}$ is a value of voltage or a value obtained by converting the voltage value into an amount of intake air, which is determined in such a range that it is lower than a voltage outputted from the AFS 2 when the burning-off takes place and it is higher than a voltage outputted from the AFS under the condition that an amount of intake air is zero and the burning-off is not carried out.

In the normal condition in which there is no erroneous burning-off operation, $V_Q<V_{th1}$ is given. In this case, the program moves from Step S6 as injection mode to Step S7. Since a injection prohibition flag is in a reset state at Step S7, fuel controlling operation is carried out at Step S8. The detail of the fuel controlling operation is not described since such operation is a well known technique.

When there takes place the burning-off by erroneous function of the burning-off controlling circuit, a relation of $V_Q>V_{th1}$ is established. Then, the program moves from Step S4 to Step S5 at which an injection prohibition flag is set. After the flag is set, injection mode is taken at Step S6. In this case, since the injection prohibition flag is set, sequential operation is returned to Step S1 without carrying out the fuel control at Step S8.

At Step S2, when the engine is operated, namely a relation of N≠0 is found, Step S9 is taken where the state of the starting switch 12 is examined. When the starting switch 12 is turned on, the output of the AFS 2 is read at Step S10, and the output value of the AFS 2 is compared with a predetermined value $V_{th2}$ at Step S11. The predetermined value $V_{th2}$ is a value of voltage or a value obtained by converting the voltage value into an amount of intake air which is so determined that it is lower than a value corresponding to an output voltage from the AFS 2 which is produced when the engine is started during the burning-off of the AFS 2, and it is higher than a value of an output voltage which is produced when the starting is normally carried out without the burning-off operation.

When the normal starting operation is carried out without any erroneous function in the burning-off controlling circuit, a relation of $V_Q<V_{th2}$ is established, then, injection mode is taken at Step S6. In this case, the injection prohibition flag is reset at Step S7, and therefore, the fuel control operation is carried out at Step S8.

On the other hand, when the bvurning-off controlling operation becomes abnormal, a relation of $V_Q>V_{th2}$ is established. Then, the injection prohibition flag is set at Step S5, after which the injection mode is taken at Step S6. Since the injection prohibition flag is set at Step S7, the sequential program is returned to Step S1 without carrying out the fuel control.

When the starting switch 12 is off at step S9, namely, the starting switch 12 is not yet started, operation goes directly to Step S6.

In the above-mentioned description, if the value $V_{th1}$ and $V_{th2}$ are in a range commonly used, the program may be modified to eliminate Steps S10 and S11 so that Step S3 follows Step S9 as indicated by a broken arrow mark to simplify the program.

In the above-mentioned embodiment, determination of the operation of the engine is made as to whether or not the revolution number is zero at Step S2. However, it is not always necessary to give the reference of N=0 because determination can be made as to whether the revolution number of the engine is higher or lower than what is considered to be substantially stopped.

With respect to determination of the situation of the starting switch 12, the program may be modified in such a manner that when the fact of N≠32 0 is found at Step S2, the sequential operation goes directly to the injection mode at Step S6. In this case, when the engine is started immediately after the start of the program, determination of N=0 cannot be made at Step S2, whereby the injection prohibition flag cannot be set. However, the disadvantages is avoidable unless the starting of the engine is finished in an extremely short time, and it is in a range practically admissible.

In the third embodiment of the present invention, the output of the hot-wire type intake air quantity sensor is detected when the engine is to be started; absence or presence of erroneouos burning-off operation is examined based on the detected output, and controlled operation for the fuel control valve is stopped upon detection of the erroneous burning-off operation. Accordingly, the fuel is not supplied to the engine during erroneous burning-off operation, and hence, a risk of the firing of the fuel is avoidable.

A fourth embodiment of the fuel control apparatus according to the present invention will be described.

Figure 6:
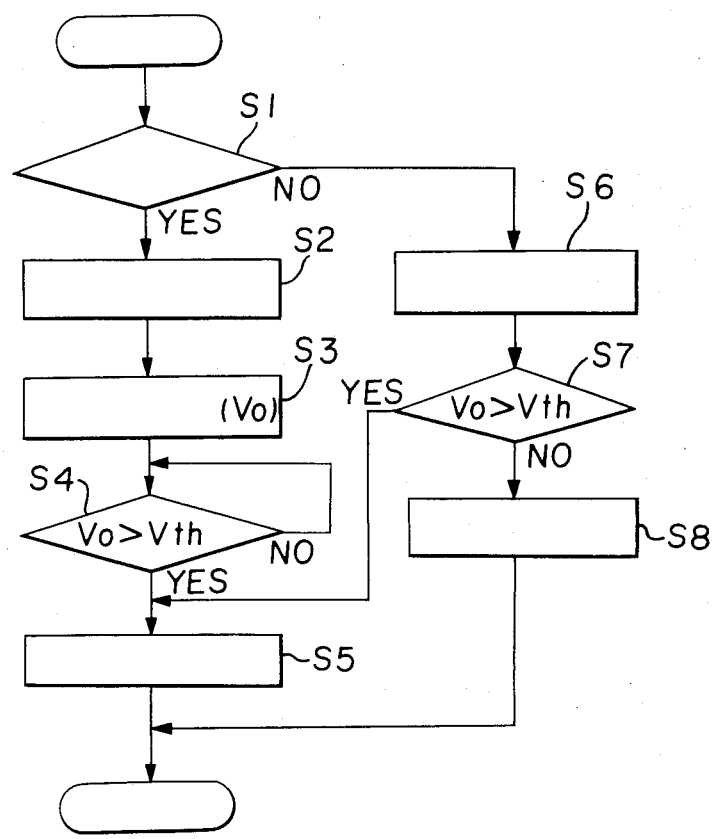
Figure 7:
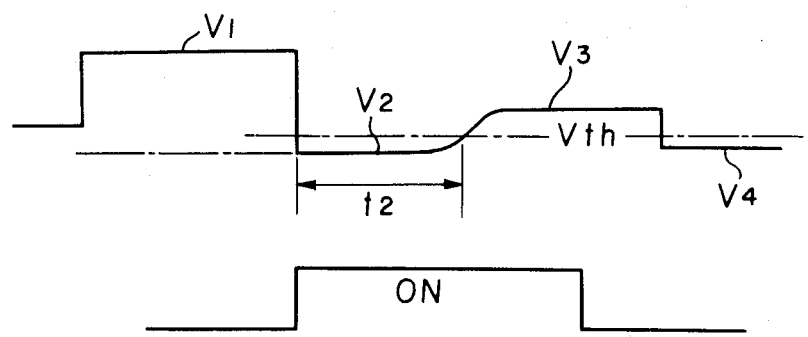
FIG. 7 is characteristic diagram showing an output from an intake air quantity sensor when a back fire occurs.

The general construction of the fourth embodiment and a control circuit used for this embodiment are the same as those of the third embodiment except for a program. Accordingly, only the operation of the fuel control apparatus is described with reference to FIGS. 6 and 7. FIG. 6 is a flow chart for controlling supply of the fuel on the basis of the output of the AFS 2, and FIG. 7 is a diagram showing an output level $V_Q$ of the AFS 2. In FIG. 7, a symbol $V_1$ represents a level corresponding to the burning-off operation, a symbol $V_2$ represents a level appearing immediately after the burning-off operation has finished, a symbol $V_3$ represents a level when the normal operation is carried out, a symbol $A_4$ represents a level appearing when a fault takes place, and a symbol $V_{th}$ represents a level for determination of the fault.

Now referring to FIG. 6, when the engine is started during the burning-off operation, determination is made as to whether or not the burning-off is still carried out at Step S1. If yes, the burning-off is stopped at Step S2. Then, an output $V_Q$ generated from the AFS 2 is read at Step S3. At Step S4, determination is made as to whether or not the output $V_Q$ exceeds the level $V_{th}$ for fault determination. If $V_Q < V_{th}$, sequential operation goes to Step S4 to repeat for the determination. Referring to FIG. 7, when the starting switch is turned on, the output $V_Q$ is decreased to the level $V_2(\doteq 0$ Volt), and the condition of the level $V_2$ continues for a predetermined time $t_2$. After the predetermined time $t_2$ has passed, the output $V_Q$ exceeds the level $V_{th}$ and returns to the normal operation level $V_3$. A fault detecting section outputs a fault signal for the AFS 2 when the output $V_Q$ is below the level $V_{th}$. However, no fault signal has to be generated while the output is on the level $V_2$ because there is no fault occurring in the AFS 2 just after the burning-off operation is carried out. For this purpose, generation of a signal for the determination of the condition of the AFS 2 is prohibited for the predetermined time $t_2$, and after the output $V_Q$ is once returned to the normal condition, judgement of the faulty level $V_4$ becomes permissible. Since the output of the AFS 2 does not correctly correspond to the quantity of the intake air during a time for prohibiting determination of fault, a correct operation for supplying fuel is not accomplished for the prohibiting time, and therefore, the fuel controlling valve is either stopped or operated depending on another parameter regardless of the output of the AFS 2.

When the condition of $V_Q > V_{th}$ is detected at Step S4, namely, after the predetermined time $t_2$ has passed, the fuel controlling operation is carried out on the basis of the output of the AFS 2 at Step S5.

When the burning-off operation is not carried out at Step S1, then the output of the AFS 2 is read at Step S6. At Step S7, determination is made as to whether or not the output $V_Q$ exceeds the value $V_{th}$. If $V_Q > V_{th}$, Step S5 is taken, at which the fuel controlling operation is carried out. If the relation of $V_Q > V_{th}$ is not detected, the fault signal is generated at Step S8, and the fuel controlling operation is not carried out.

A display device may be provided to show a result of the determination of fault.

In accordance with the fourth embodiment of the present invention, generation of a signal indicative of the fault of the intake air quantity sensor is prohibited until the output of the sensor reaches a predetermined level after burning-off operation. Accordingly, even though the output of the sensor reduces just after the burning-off operation, an erroneous signal for determination of fault is not provided.

The function as described with reference to the first to fourth embodiments can be obtained by slight modification of a conventional program for operating fuel control apparatus. Therefore, an additional cost for the modification is minimized. Further, the fuel control apparatus of the present invention remarkably increases reliability.

I claim:

1. A fuel control apparatus comprising:
    (a) a hot-wire type intake air quantity sensor disposed in an air intake passage for an internal combustion engine to detect the quantity of air passing therethrough;
    (b) a fuel control valve placed in said air intake passage to inject fuel into said air intake passage;
    (c) first means for actuating said fuel control valve;
    (d) second means for heating a hot wire in said hot-wire type intake air quantity sensor to a temperature higher than the normal operating temperature of said hot-wire type intake air quantity sensor in order to burn off deposits on the surface of said hot-wire type intake air quantity sensor;
    (e) third means for generating a burning-off control signal when conditions for operating said second means are satisfied; and
    (f) fourth means for inhibiting said first means in response to said burning-off control signal, said fourth means comprising:
        (i) fifth means for determining whether the engine speed is above or below a predetermined value N;
        (ii) sixth means for determining whether the output of said air quantity sensor is above or below a predetermined value $V_{th1}$ if the engine speed is below the predetermined value N, said predetermined value $V_{th1}$ being a value lower than the output from said air quantity sensor when the burning-off is taking place and higher than the output from said air quantity sensor when the air intake is zero and burning-off is not taking place, said third means being responsive to a determination that the output of said air quantity sensor is less than the value $V_{th1}$ and said first means being inhibited by a determination that the output of said quantity sensor is more than the value $V_{th1}$; and
        (iii) seventh means for determining whether the output of said air quantity sensor is above or below a predetermined value $V_{th2}$ if the engine speed is above the predetermined value N, said predetermined value $V_{th2}$ being a value lower than the output from said air quantity sensor when the engine is started while burning-off is taking place and higher than the output of said air quantity sensor when the engine is started while burning-off is not taking place, said third means being responsive to a determination that the output of said air quantity sensor is less than the value $V_{th2}$ and said first means being inhibited by a determination that the output of said air quantity sensor is more than the value $V_{th2}$.

2. A fuel control apparatus as recited in claim 1 wherein $N=0$.

3. A fuel control apparatus comprising:
    (a) a hot-wire type intake air quantity sensor disposed in an air intake passage for an internal combustion engine to detect the quantity of air passing therethrough;
    (b) a fuel control valve placed in said air intake passage to inject fuel into said air intake passage;
    (c) first means for actuating said fuel control valve;
    (d) second means for heating a hot wire in said hot-wire type intake air quantity sensor to a temperature higher than the normal operating temperature of said hot-wire type intake air quantity sensor in order to burn off deposits on the surface of said hot-wire type intake air quantity sensor;

(e) third means for generating a burning-off control signal when conditions for operating said second means are satisfied; and
(f) fourth means for inhibiting said first means in response to said burning-off control signal, said fourth means comprising:
  (i) eighth means for determining whether or not a burning-off operation is taking place when the engine is started;
  (ii) ninth means for stopping the burning-off operation if said eighth means determines that a burning-off operation is taking place when the engine is started;
  (iii) tenth means for determining whether the output of said air quantity sensor is above or below a predetermined value $V_{th}$ after said ninth means has stopped the burning-off operation, said first means being inhibited by a determination that the output of said air quantity sensor is below the predetermined value $V_{th}$; and
  (iv) eleventh means for determining whether the output of said air quantity sensor is above or below the predetermined value $V_{th}$ if the eighth means determines that a burning-off operation is not taking place when the engine is started, said first means being inhibited by a determination that the output of said air quantity sensor is below the predetermined value $V_{th}$.

* * * * *